United States Patent
Kim et al.

(10) Patent No.: US 7,483,877 B2
(45) Date of Patent: Jan. 27, 2009

(54) DYNAMIC COMPARISON OF SEARCH SYSTEMS IN A CONTROLLED ENVIRONMENT

(75) Inventors: Moon Ju Kim, Wappingers Falls, NY (US); Yurdaer Nezihi Doganata, Chestnut Ridge, NY (US); Youssef Drissi, Ossining, NY (US); Lev Kozakov, Stamford, CT (US)

(73) Assignee: International Business Machines Corporation, Armonk, NY (US)

( * ) Notice: Subject to any disclaimer, the term of this patent is extended or adjusted under 35 U.S.C. 154(b) by 558 days.

(21) Appl. No.: 10/412,808

(22) Filed: Apr. 11, 2003

(65) Prior Publication Data

US 2004/0205051 A1 Oct. 14, 2004

(51) Int. Cl.
  *G06F 17/30* (2006.01)
(52) U.S. Cl. .............................. 707/3; 707/10; 707/102; 707/104.1
(58) Field of Classification Search ................. 707/3–5, 707/104.1, 102
  See application file for complete search history.

(56) References Cited

U.S. PATENT DOCUMENTS

| | | | | |
|---|---|---|---|---|
| 5,893,092 | A * | 4/1999 | Driscoll | 707/5 |
| 6,008,817 | A * | 12/1999 | Gilmore, Jr. | 345/440 |
| 6,240,408 | B1 | 5/2001 | Kaufman | 707/3 |
| 6,327,590 | B1 * | 12/2001 | Chidlovskii et al. | 707/5 |
| 6,526,440 | B1 * | 2/2003 | Bharat | 709/219 |
| 6,711,568 | B1 * | 3/2004 | Bharat et al. | 707/5 |
| 6,738,764 | B2 * | 5/2004 | Mao et al. | 707/5 |
| 6,766,316 | B2 * | 7/2004 | Caudill et al. | 707/3 |
| 2002/0007364 | A1 * | 1/2002 | Kobayashi et al. | 707/10 |
| 2002/0016787 | A1 * | 2/2002 | Kanno | 707/5 |
| 2003/0149686 | A1 | 8/2003 | Drissi et al. | |
| 2003/0149687 | A1 | 8/2003 | Brown et al. | |
| 2003/0177111 | A1 * | 9/2003 | Egendorf et al. | 707/3 |
| 2003/0225722 | A1 | 12/2003 | Brown et al. | |
| 2003/0225747 | A1 | 12/2003 | Brown et al. | |
| 2004/0019588 | A1 | 1/2004 | Doganata et al. | |
| 2004/0024748 | A1 | 2/2004 | Brown et al. | |
| 2004/0044669 | A1 | 3/2004 | Brown et al. | |
| 2004/0111408 | A1 * | 6/2004 | Caudill et al. | 707/3 |

(Continued)

OTHER PUBLICATIONS

Sergey Brin & Lawrence Page—"The Anatomy of a Large-Scale Hypertextual Web Search Engine" Computer Science Dept. Stanford University, Stanford, CA 94305.

(Continued)

*Primary Examiner*—Charles Rones
*Assistant Examiner*—Rezwanul Mahmood
(74) *Attorney, Agent, or Firm*—Norman Gundel (57) ABSTRACT

A random document is stripped of the relevant search terms to generate a non-relevant document. The relevant search terms are formed into grammatically correct but not necessarily technically correct sentences. The grammatically correct sentences are placed at the beginning of the random document in one pass through the system in the middle of a document in a second pass through the system and at the end of the document in a third pass through the system. A relevancy vector chart is computed using the references documents and a known relevancy algorithm relating to position of search terms. The results obtained from search engines are compared to the relevancy vector chart to determine the relative relevancy of the returned search results from the search engines.

11 Claims, 9 Drawing Sheets

U.S. PATENT DOCUMENTS

2004/0181525 A1* 9/2004 Itzhak et al. .................. 707/5

OTHER PUBLICATIONS

Sergey Brin & Lawrence Page—"The Anatomy of a Large-Scale Hypertextural Web Search Engine" Computer Science Dept., Stanford University Stanford, CA 94305; 1998; pp. 107-117; vol. 30—Issue 1-7 Published by: Elsevier Science Publishers BV Amsterdam, The Netherlands.

Sergey Brin & Lawrence Page—"The Anatomy of a Large-Scale Hypertextural Web Search Engine" Computer Science Dept. Stanford University Stanford, CA 94305; 1998; pp. 107-117; vol. 30 -Issue 1-7.

* cited by examiner

DYNAMIC COMPARISON OF SEARCH SYSTEMS IN A CONTROLLED ENVIRONMENT

RELATED APPLICATIONS

The contents of the following listed applications are hereby incorporated by reference:

(1) U.S. patent application, Ser. No. 10/157,243, filed on May 30, 2002 and entitled "Method and Apparatus for Providing Multiple Views of Virtual Documents" which application was published on Dec. 4, 2003 as Publication #US20030225722A1.

(2) U.S. patent application, Ser. No. 10/159,373, filed on Jun. 3, 2002 and entitled "A System and Method for Generating and Retrieving Different Document Layouts from a Given Content" which application has now issued as U.S. Pat. No. 7,254,571 on Aug. 17, 2007.

(3) U.S. patent application, Ser. No. 10/180,195, filed on Jun. 27, 2002 and entitled "Retrieving Matching Documents by Queries in Any National Language" which application has now issued as U.S. Pat. No. 7,260,570 on Aug. 21, 2007.

(4) U.S. patent application Ser. No. 10/202,564 filed on Jul. 23, 2002 and entitled "Method of Search Optimization Based on Generation of Context Focused Queries" which application was published Jan. 29, 2004 as Publication #US20040019588A1.

(5) U.S. patent application Ser. No. 10/209,619 filed on Jul. 31, 2002 and entitled "A Method of Query Routing Optimization" which application has now issued as U.S. Pat. No. 7,143,085 on Nov. 28, 2006.

(6) U. S. patent application Ser. No. 10/066,346 filed on Feb. 1, 2002 and entitled "Method and System for Searching a Multi-Lingual Database" which application has now issued as U.S. Pat. No.6,952,691 on Oct. 4, 2005.

(7) U.S. patent application Ser. No. 10/229,552 filed on Aug. 28, 2002 and entitled "Universal Search Management Over One or More Networks" which application has now issued as U.S. Pat. No. 7,092,938 on Aug. 15, 2006.

(8) U.S. patent application Ser. No. 10/302,108 filed on Nov. 22, 2002 and entitled "An International Information Search and Delivery System Providing Search Results Personalized to a Particular Natural Language" which application has now issued as U.S. Pat. No. 7,039,625 on May 2, 2006.

FIELD OF THE INVENTION

The present invention relates to performing keyword searches and obtaining search results in selected languages on database networks. More particularly, it relates to the improvement of the effectiveness of searches in obtaining desired search results.

BACKGROUND OF THE INVENTION

Internet text retrieval systems accept a statement for requested information in terms of a search query S made up of a plurality of keywords $T_1, T_2, \ldots T_i, \ldots T_n$ and return a list of documents that contain matches for the search query terms. To facilitate the performance of such searches on internet databases, search engines have been developed that provide a query interface to the information containing sources and return search results ranked sequentially on how well the listed documents match the search query. The effectiveness in obtaining desired results varies from search engine to search engine. This is particularly true in measurement of effectiveness in searching certain product support databases which can be heavily weighted with technical content. This information can be in a number of natural languages, both analog and digital form, and in a number of different formats, and in multiple machine languages. Further, while a search engine may be effective in identifying and ranking subject matter in one technical area, it can be ineffective in selecting the most pertinent references in another technical area. Therefore it would be desirable to be able to automatically evaluate the effectiveness of search engines in turning up and ranking documents in selected technical areas.

Therefore it is an object of the present invention to provide a tool for automatic measurement of the ability of a search engine to provide comprehensible search results.

Another object of the present invention is to automatically compare the ability of search engines to provide desired research results.

It is further an object of the present invention to measure a search engines ability to provide requested information to searchers in a selected technical area.

BRIEF DESCRIPTIONS OF THE INVENTION

In accordance with the present invention, in a computer automated search engine, results are dynamically compared by using a reference document which is stripped of relevant search terms and then repopulated with the search terms in accordance with at least one known relevancy algorithm. An example of such a relevancy algorithm involves the position of search terms in a document. When search terms appear early in the document, the document is more relevant than when the search terms appear later in the document. To obtain a relevancy vector chart, a random document is stripped of the relevant terms to generate a non-relevant document. The relevant terms are then formed into sentences by an insertion controller which arranges them in grammatically correct but not necessarily technically correct sentences. The created sentences then are placed back into the document in a selected portion of the document. For instance, correct sentences could be placed at the beginning of the document in one pass through the system. In the middle of a document the second pass through the system and the third time be placed at the end of the document. Each time a different relevancy vector is computed for the reference document by using the known relevancy algorithm to create a relevancy vector chart. Sample search terms are then placed through various search engines, the results obtained from each search engine are compared to the relevancy vector chart to determine the relevancy of the returned search terms based on the relevancy vector chart. The higher the score the more relevant the documents obtained by a particular search engine. Thus the search engines can be rated based on the selected relevancy algorithm or algorithms.

DESCRIPTION OF THE DRAWINGS

FIG. 6 (*a*), (*b*) and (*c*) is a schematic showing the distribution of keywords in generated documents;

DETAILED DESCRIPTION OF THE INVENTION

Figure 1:
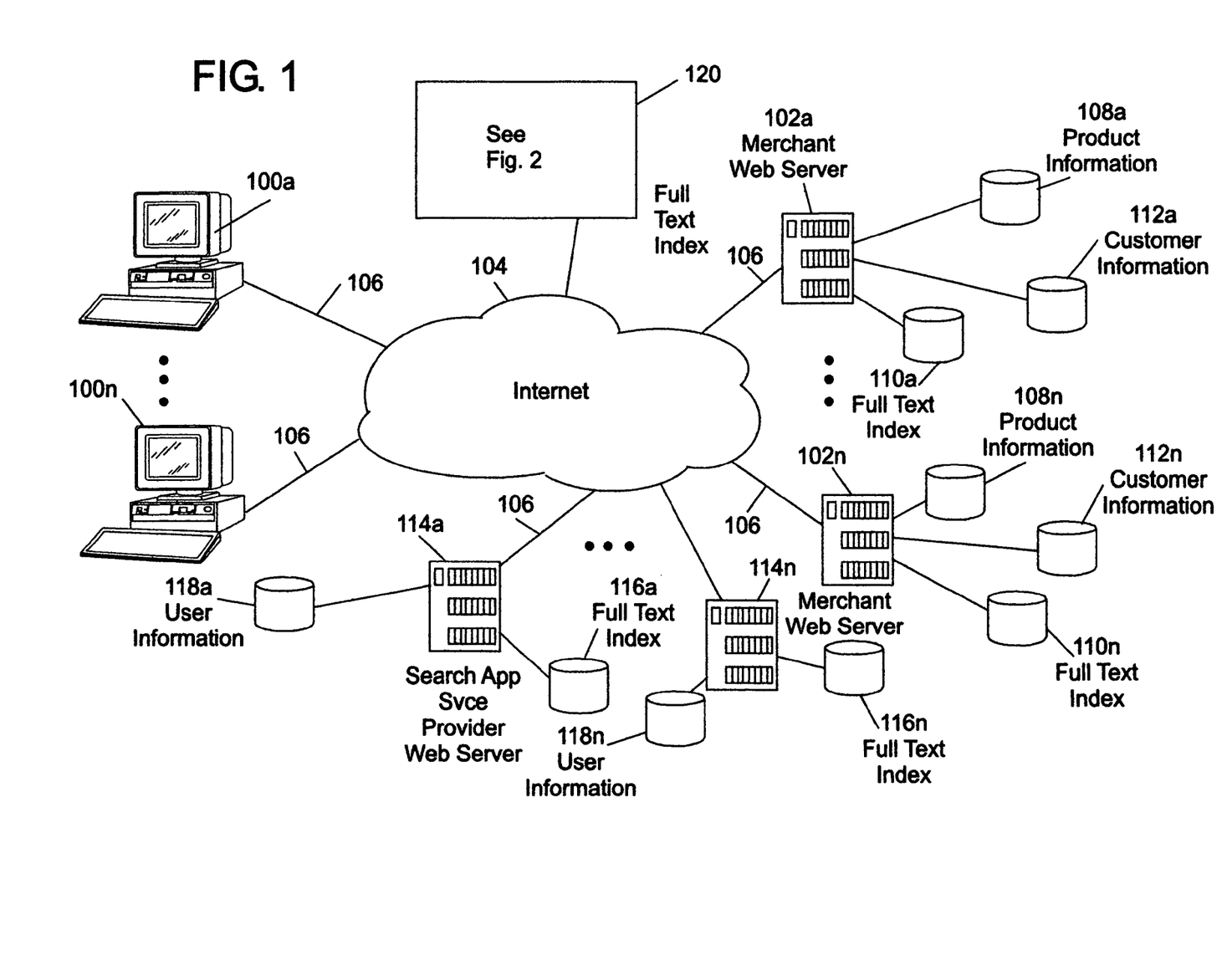
FIG. 1 is a schematic diagram for system organization of an on-line area network.

Referring now to FIG. 1, communication between a plurality of user computers 100*a* to 100*n* and a plurality of information servers 102*a* to 102*n* is accomplished via an on-line service through a wide area network such as the Internet 104 that includes network node servers. The network node servers manage network traffic such as the communications between any given user's computer and an information server.

The computers 100 are equipped with communications software, including a WWW browser such as the Netscape browser of Netscape Communications Corporation, that allows a shopper to connect and use on-line shopping services via the Internet. The software on a user's computer 100 manages the display of information received from the servers to the user and communicates the user's actions back to the appropriate information servers 102 so that additional display information may be presented to the user or the information acted on. The connections 106 to the network nodes of the Internet may be established via a modem or other means such as a cable connection.

The servers illustrated in FIG. 1, and discussed hereafter, are those of merchants which, for a fee provide products, services and information over the Internet. While the following discussion is directed at communication between shoppers and such merchants over the Internet, it is generally applicable to any information seeker and any information provider on a network. (For instance, the information provider can be a library such as a University library, a public library or the Library of Congress or other type of information providers.) Information regarding a merchant and the merchant's products is stored in a shopping database 108 to which the merchants servers 102 have access. This may be the merchants own database or a database of a supplier of the merchant. All product information accessible by the merchant servers that is publishable as web pages is indexed and a full-text index database 110 which records the number of occurrences of each of the words and their use in the location. In addition to the servers of individual merchants, and other information providers, there are the servers 114*a* to 114*n* of plurality of search service providers, such as Google of Google, Inc., which providers maintain full text indexes 116 of the products of the individual merchants 102*a* to 102*n* obtained by interrogating the product information databases 108 of the individual merchants. Some of these search service providers, like Google, are general purpose search providers while others are topic specific search providers.

The merchants and the search application service providers each may maintain a database of information about shoppers and their buying habits to customize on-line shopping for the shopper. Operations to accomplish a customized electronic shopping environment for the shopper include accumulating data regarding the shopper's preferences. Data relating to the electronic shopping options, such as specific sites and specific products selected by the shopper, entry and exit times for the sites, number of visits to the sites, etc., are recorded and processed by each merchant to create a shopping profile for the shopper. Raw data may then be processed to create a preference profile for the shopper. The profile may also include personal data or characteristics (e.g. age, occupation, address, hobbies) regarding the shopper as provided by the shopper when subscribing to the service or obtained from other sources. Profile data can help in discerning the meaning of words used in a keyword query. For instance, a keyword in the query of a medical doctor could have an entirely different meaning to the use of the same keyword presented by a civil engineer. The data accumulation on the shoppers are placed in the shoppers profile database 112 or 118 of each of the merchants. Each individual shopper's profile in the databases of the merchants and the search application service providers can differ from one to another based on the particular merchant's or service providers experience with the shopper and their profiling software. Data collection may continue during searches made by the shopper so that up-to-date profile data for the shopper is obtained and used.

With information regarding the shopper involved in the shopping transaction, the merchant is able to meet the needs of the shopper, and the shopper is presented with the opportunity to view and purchase that merchandise that is most likely to be of interest since the merchant's products and services are directed toward those shoppers who have, either directly or indirectly, expressed an interest in them.

When the search characteristics in the form for key words are entered by the shopper into the space provided on the default or home page of his/her browser, the search engine of the merchant web server 102 does a search of the accessed full text index database 110 or 118 using the key words and gets a list of documents describing those products and services that contain matches to the key words. This list of documents contain a basic test ranking, Tf, (including the number of hits, their location, etc. which are used to order the list of documents) with documents with higher scores at the top. This list is then sent to a ranking module which will apply a ranking algorithm, such as the one described in the article entitled "The Anatomy of a Large-Scale Hypertextual Web Search Engine" by Sergey Brim and Lawrence Page of the Computer Science Department, Stanford University, Stanford Calif 94305 (which article is hereby incorporated by reference) to rank the list of documents using the text factors and other rank factors, such as link analysis, popularity, the user's preferences from the users profile, and may also introduce factors reflecting the information, providers biases and interests. A reordered list of documents based on the ranking algorithm is then provided to the user.

Figure 2:
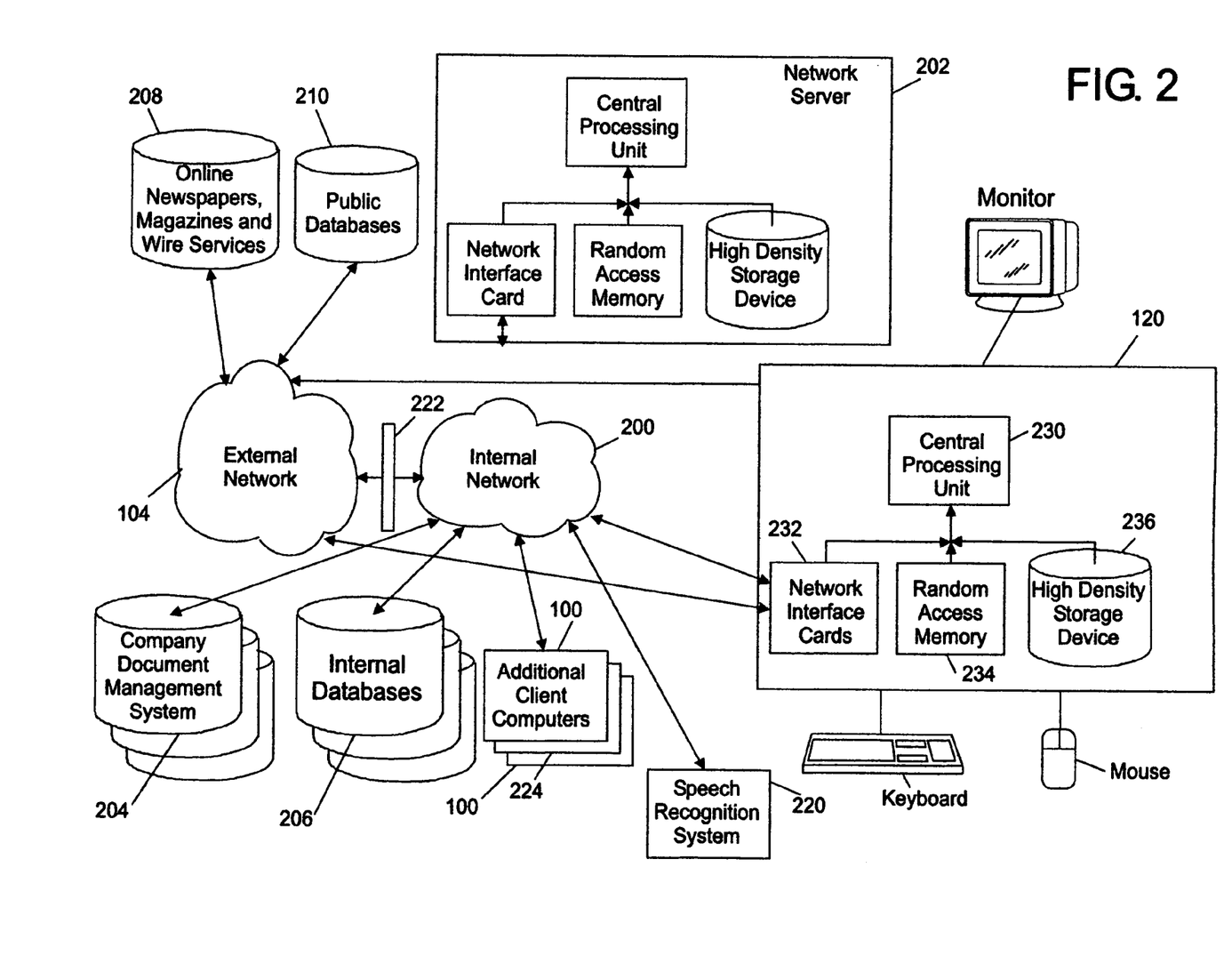
FIG. 2 is a schematic diagram of a private network incorporating the present invention and connected to the network shown in FIG. 1.

FIG. 2 shows how a multi-language internet search management server 120 can be used as one of the merchants web server 120 to obtain information from the merchant and supply it to a user. As shown in FIG. 2, the search management server 120 is connected in a private intranet network 200 with a server 202 and a number of computers 100, such as those described in FIG. 1, so that the computers 100 can obtain information stored in the internal sources of the private intranet. The intranet 200 is provided with public internet access capability which provides access to services on the public internet 104. A "firewall" 222 separates the public internet 104 from the private intranet 200 allowing only those with the proper ID and password to enter the intranet 200 from the public internet 104. Internal sources of the intranet 200 are company document management systems 204, and internal databases 206. Also, intranet 200 is provided with a speech recognition system 220 capable of responding to compressed digitized data of voice commands and voice dictation provided by the client computers 100 either from an individual computer 100 or a client's network of such computers.

In the above mentioned U.S. application Ser. No. 10/180,195, (publication #US2003-0149687A1, published Aug. 07, 2003), the search management server 120 contains an integrated search management system which receives queries and information from search engines both in the intranet and internet and accesses information sources other than those that are in the intranet and internet through the computers 100. For example, voice messages transmitted to computer 224 and connected to text by a speech recognition system 220 can be stored in the integrated search management system. The integrated management server contains a central processing unit 230, network interfaces 232 and sufficient random access memory 234 and high density storage 236 to perform its functions. In addition to its connection to the intranet, the search management system contains a direct link 226 to the internet to enable access by customers of the merchant.

Recently, the number of search systems and search engines types grew rapidly. For each given domain, a diversity of specialized search engines could be presented as potential candidates offering different features and performances. This recent proliferation created the need for a way to compare these search systems and decide which one best suits a given context and requirements. Moreover, in several cases, these search systems could be used in distributed environments where the search domain or search type change dynamically according to the user profile and input. In these distributed environments, many search engines are integrated to serve potential search types and domains accepted by the system. In this case, the decision regarding the best integrated search system, for a given user profile or input for instance, needs to be made preferably in a dynamic way without human or manual intervention.

This invention provides a solution to this problem through a search evaluation system in a controlled environment, allowing for dynamic scoring of a given set of search systems with a specific search feature to be compared. It has advantages in comparison with the prior art which is mainly based on static surveys done by users or matter experts, or based on building benchmark systems using predefined search queries with predefined matching documents, then by measuring how good is the search system in finding these "targeted" documents.

Figure 3:
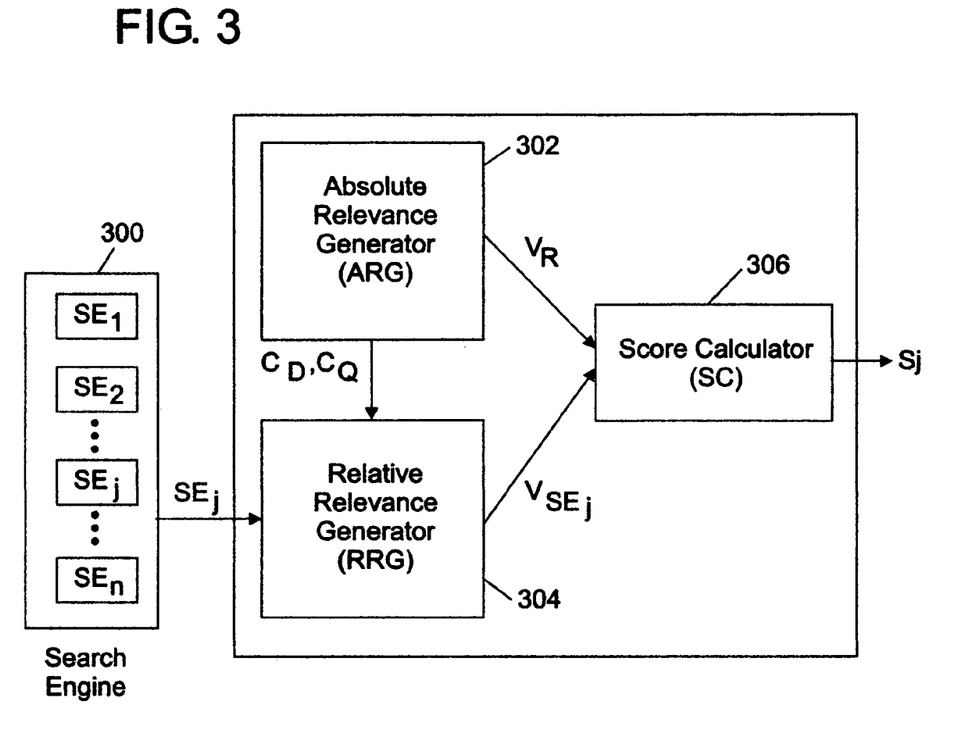
FIG. 3 is a schematic diagram showing the arrangement of software of the present invention.

As shown in FIG. 3, in order to compare a set of search engines Sej[where j=1,2, . . . n] 300, this dynamic and automatic process generates a score Sj for each SEj. There are 3 modules of this system. The Absolute Relevance Generator (ARG) module 302 is responsible for generating a set of documents $C_D$, a set of queries $C_o$, and a vector $V_R$ of reference point performance regarding the specific search system feature at hand. (The following descriptions and figures assume that a specific search system feature to be compared is already fixed.) The Relative Relevance Generator (RRG) module 304 is responsible for using the set documents $C_D$ and set of queries $C_o$ generated by the ARG to generate a vector $V_{SEj}$ of search engine SEj performance regarding the feature at hand. The Score Calculator (SC) module 306 is responsible for computing a score Sj for each search engine SEj given the reference performance measure $V_R$ and the performance vector $V_{SEj}$.

The Structure of the ARG Module

Figure 4:
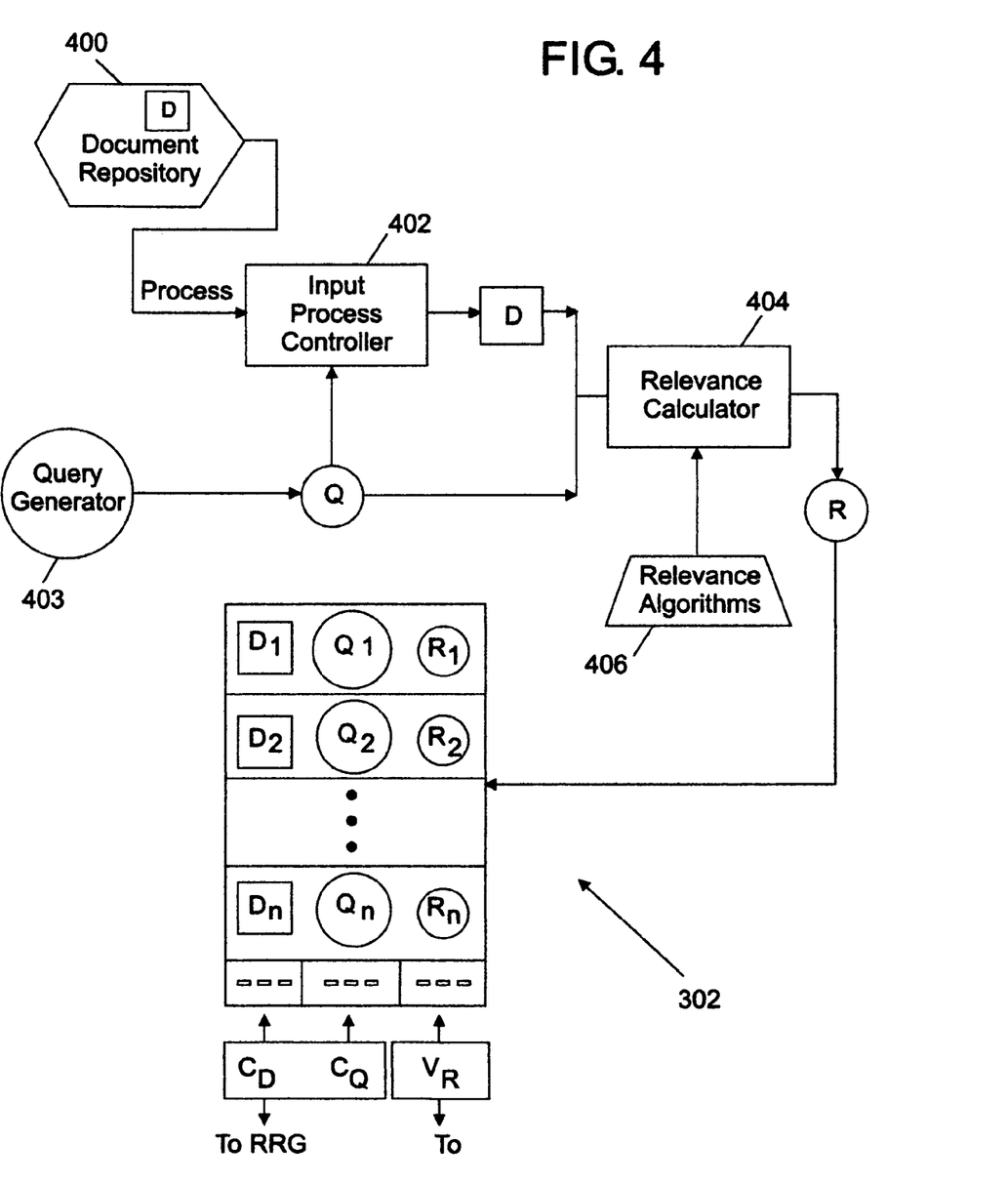
FIG. 4 is a schematic diagram showing details of the ARC module in FIG. 3.

FIG. 4 illustrates the internal structure of the ARG module 302 of FIG. 3 that takes as an input a set of random documents D from a repository of documents 400. Random search queries are generated using words extracted randomly from the documents in the repository. The set of documents D are extracted from the repository and processed by the insertion Process Controller 402 which changes the content of each document in a controlled way, through insertions and deletions of terms by a query generator 403, to give the processed document a certain desired property, for instance, its content, its structure, or the distribution of words in the document. Then, a reference relevance calculator 404 is chosen from a repository of standard relevancy computing algorithms 406. This calculator, which should be fixed, takes each document $D_a$ to $D_d$ as an input and provides a relevance value R as an output. These output relevance values R are collected in the reference vector $V_R$.

The Structure of the IPC Module

Figure 5:
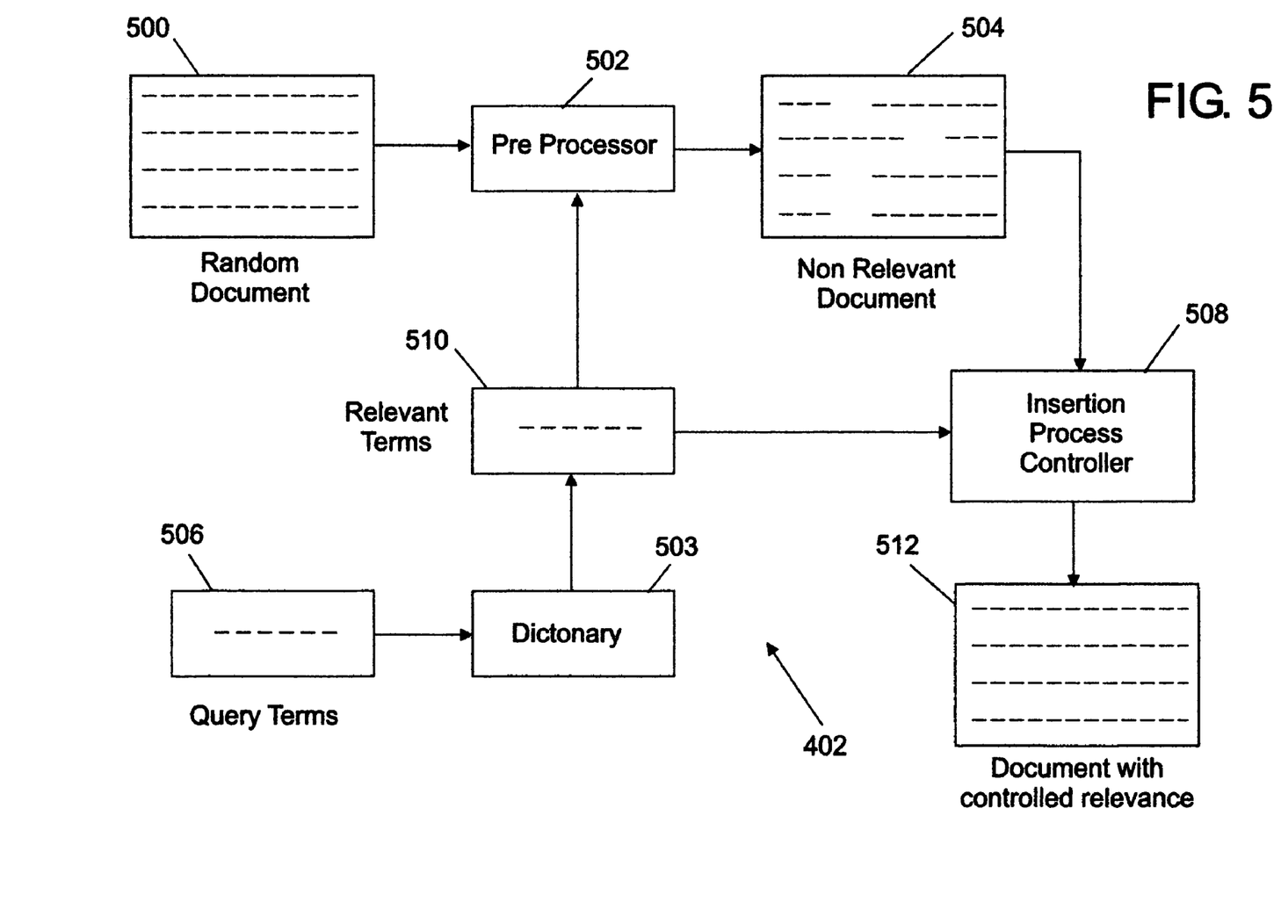
FIG. 5 is a schematic flow diagram showing the functioning of the IPC module in the ARC module.

FIG. 5 illustrates the internal structure of the IPC module 402 of FIG. 4 that takes as input a document 500 from the random set of documents D and processes it in a preprocessor 502 by deleting any terms in a dictionary 503 correlated to the search query terms 506 in any way so the output document is a nonrelevant document 504 not correlated or relevant to the query terms 506 by any relevant search terms 510, but still has the context and domain properties of its original repository to make the relevance of the document 504 as close as possible to zero.

The next step is a controlled insertion process by an insertion process controller (IPC) 508 where search terms and other relevant terms 510 are inserted with a given set of properties like distribution, density and structure. The final document 512 should have the relevant terms with the properties that optimize and facilitate the comparison of the feature at hand. The relevancy algorithm used in the IPC is tightly related to the comparison criterion used to compare the search engines. By changing the IPC algorithm of the insertion controller 508, we change the criterion of comparison. That allows comparison against multiple criterions and therefore have a more efficient and comprehensive comparison. The particular algorithm discussed below relates to the position of query terms within a document. However other algorithms can be used in the IPC module. For instance, one dealing with the proximity of query terms to one another in the document or the number of times one or the other of the query terms appears in the document.

Figure 6A:
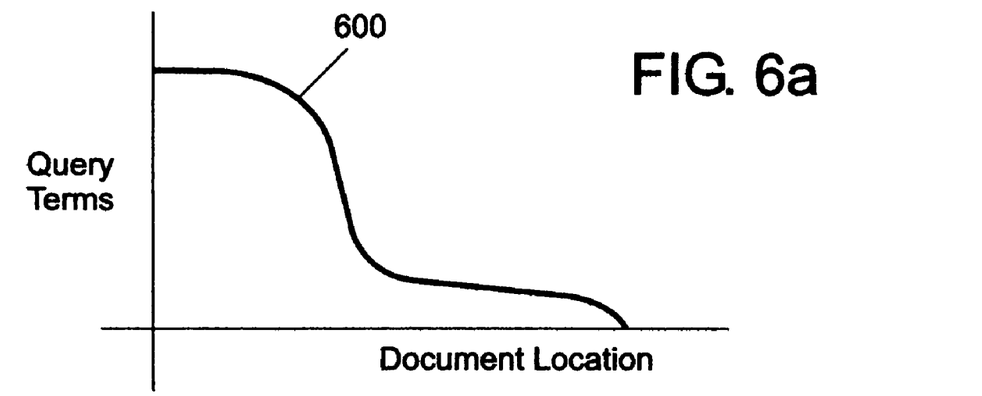
Figure 6B:
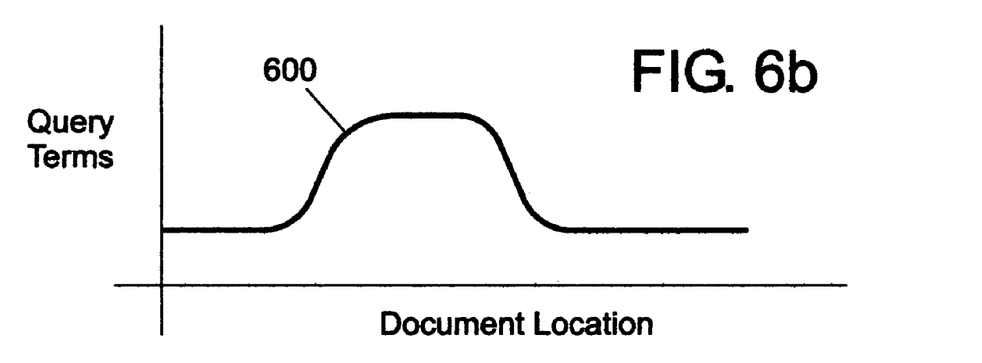
Figure 6C:
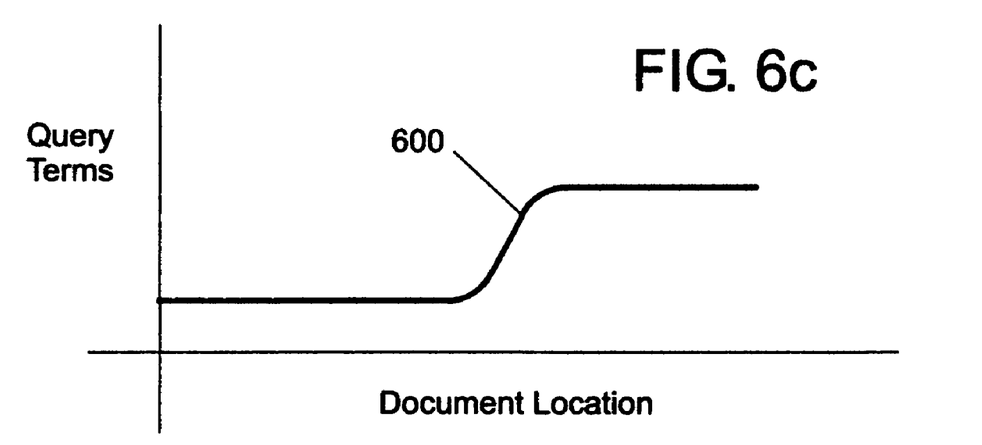

Referring first to FIG. 6, the algorithm relating to positioning of query terms 600 within a document proscribes that the document is most relevant when the query terms appear early in the document, as shown in (a) particularly when they appear in the title. The document is less relevant when they appear in the middle of the document, as shown in (b), and least relevant when they appear at the end of the document as shown in (c). Returning now to FIG. 5, as pointed out above, to obtain a relevancy vector chart covering the distribution of query terms, a random document 500 is stripped of the relevant terms by the preprocessor 502 to generate a non-relevant document 504. The relevant terms 510 are then formed into sentences by the insertion controller 508 which arranges them in grammatically correct but not necessarily technically correct sentences. The created sentences then are placed back into the document in a selected portion of the document. For instance to create a first document 512 with controlled relevance, correct sentences could be placed at the beginning of the document in one pass through the system as shown in FIG. 6(*a*). A second controlled relevance document is generated by placing grammatically correct sentences in the middle of the document 512, as shown in FIG. 6(*b*), in a second pass through the system. And in a third pass through the system, the grammatically correct sentences are placed at the end of the document 512, as shown in FIG. 6(c) to produce a third controlled relevance document. Each time a different relevancy vector is computed for the controlled reference document by using a relevancy algorithm relating to the position to the sentences containing the query terms to create a relevancy vector chart. Sample search terms are then placed through various search engines, the results obtained from each search engine are compared to the relevancy vector chart to determine the relevancy of the returned search terms based on the relevancy vector chart. The higher the score the more relevant the documents obtained by a particular search engine. Thus the search engines can be rated based on the selected relevancy algorithm or algorithms.

The RRG Module

Figure 7:
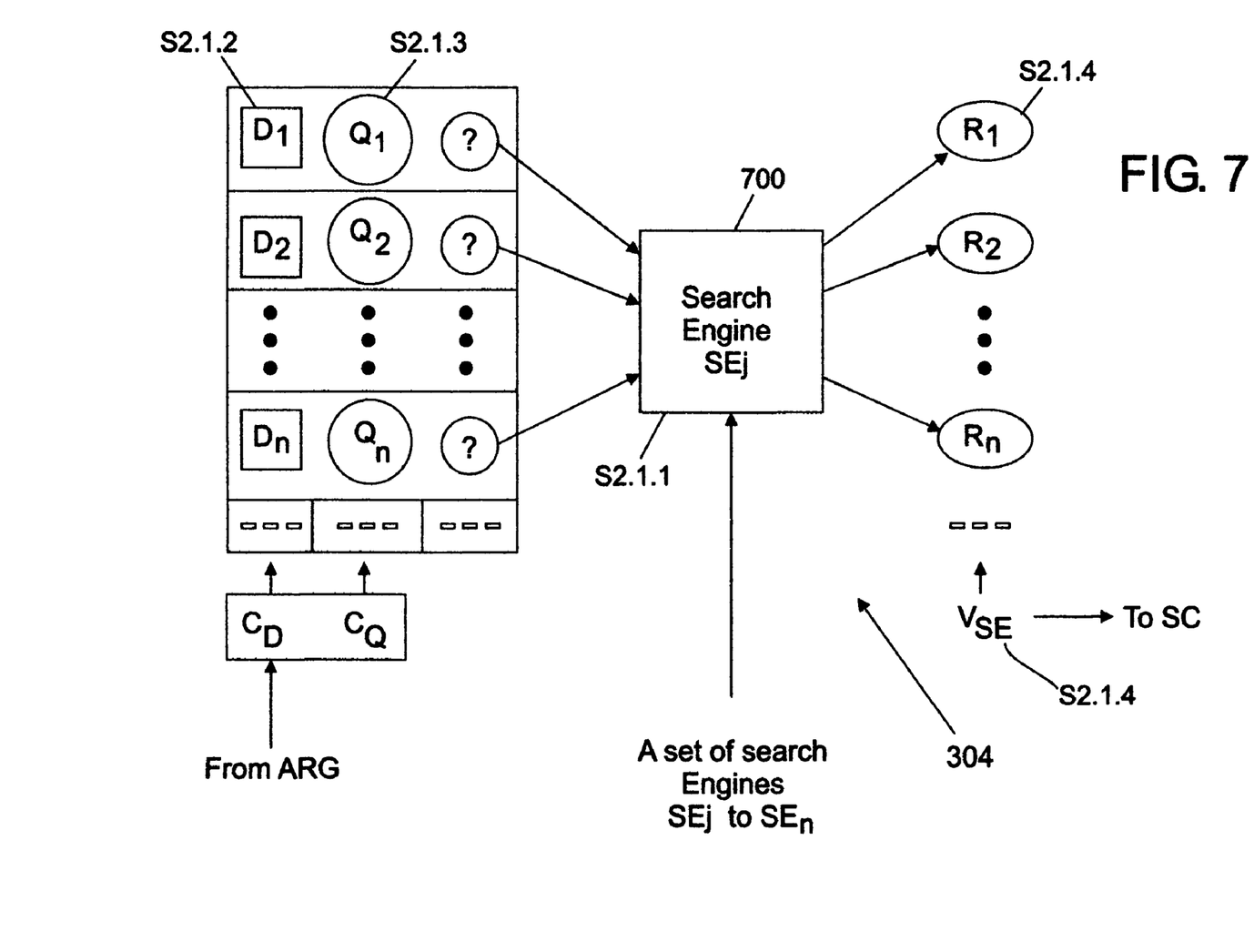
FIG. 7 is a schematic diagram of the RRG module of FIG. 3.

As shown in FIG. 7, the Relative Relevance Generator 304 of FIG. 3 processes each search engine 700 by taking the set of documents $C_D$ and the set of queries $C_o$, generated by the ARG module 402 of FIGS. 3 and 5, and generating a vector $V_{SEj}$ of the performance of each search engine SEJ based on the relevance algorithm.

The SC Module

Figure 8:
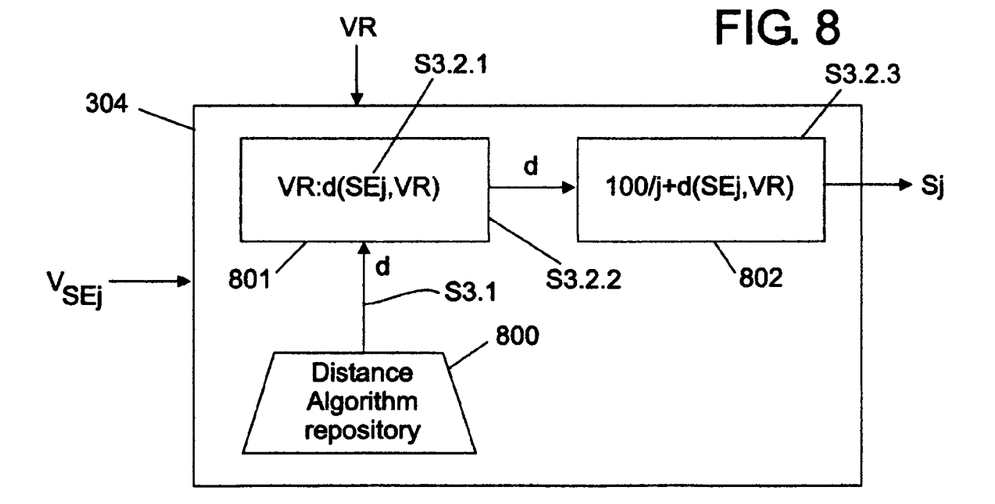
FIG. 8 is a schematic diagram of the SC module of FIG. 3.

FIG. 8 illustrates the internal structure of the SC module 306 of FIG. 3 that takes as input two generated vectors of relevance values V and with a distance algorithm from the distance algorithm repository computes 802 the score Sj of the search engine SEj using steps 3.2.3 below, where the function d is a distance measure. As default, the standard Euclidean distance could be chosen.

Figures 9, 9A:
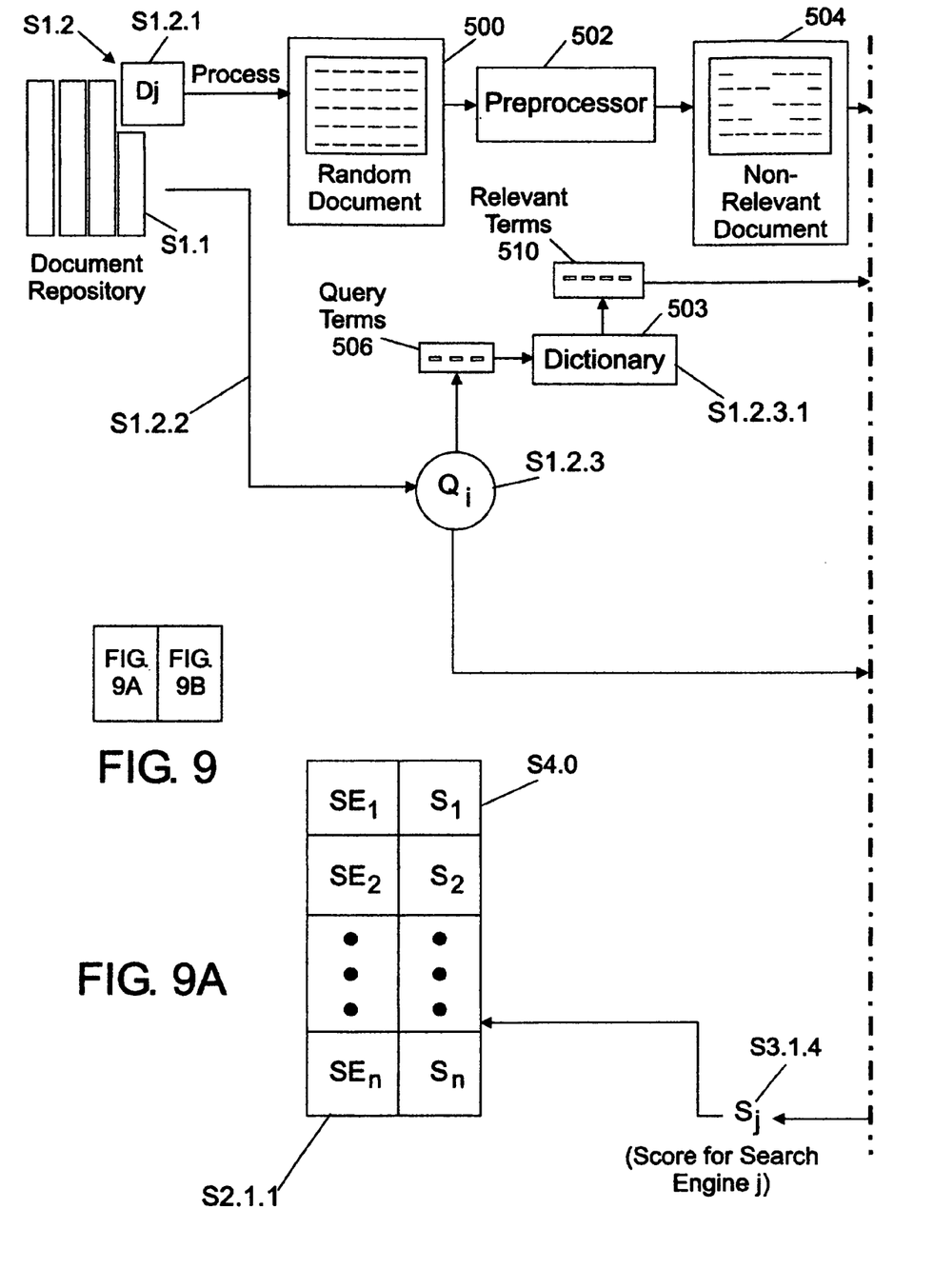
FIGS. 9A and 9B contain a process diagram showing the obtaining of a relevancy rating in accordance with the present invention.
Figure 9B:
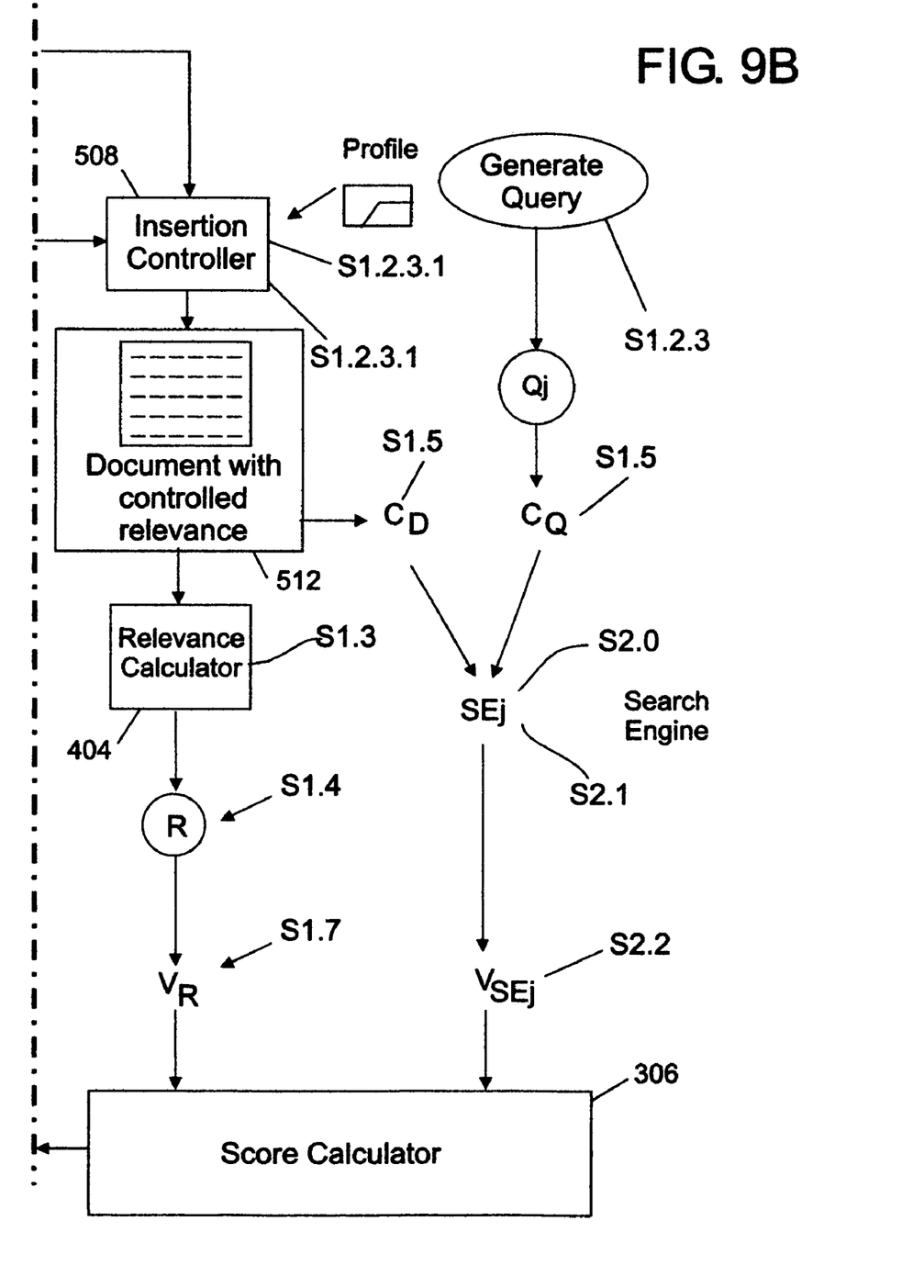

An overall view of a procedure performed in accordance with the present invention is shown in FIG. 9. The steps of the procedure are as follows:

An overall view of a procedure performed in accordance with the present invention is shown in FIGS. 4, 7, 8 and 9. The steps (S) of the procedure are as follows:

Step 1.0 As shown in the FIG. 9, run the process for the ARG 302 as follows:
- Step 1.1—Prepare a document repository, potentially from a specific domain.
- Step 1.2—Start a loop of document selection and processing as follows:
  - Step 1.2.1—Select random document Di(i=1,2, . . . ,n) from the document repository;
  - Step 1.2.2—Generate a query Qi(i=1,2, . . . ,n) by combining random terms extracted from the documents in the repository;
  - Step 1.2.3—Process Di and Qi with the IPC 402 of FIG. 4 as follows:
    - Step 1.2.3.1—use dictionary and linguistic tools to generate all variants and terms relevant to the Qi terms;
    - Step 1.2.3.2—remove all the generated terms from the document D;
    - Step 1.2.3.3—select an insertion profile. An insertion profile is algorithm that specifies how to insert terms in a document. For example a profile might specify to insert a lot of relevant terms in the beginning of the document and much less in the middle and the end of the document;
    - Step 1.2.3.4—use the IC module to insert relevant terms (generated in 1.2.2) according to the selected profile.
- Step 1.3—Select an algorithm for computing relevancy from a given repository of relevancy computing algorithms that take a query $Q_i$ and a document $D_i$ as inputs;
- Step 1.4—Compute the numerical value of the relevance for Qi and Di;
- Step 1.5—Store the documents $D_1, D_2, \ldots, D_n$ in document set $C_D$;
- Step 1.6—Store the documents $Q_1, Q_2, \ldots, Q_n$ in document set $C_q$;
- Step 1.7—Store the documents $R_1, R_2, \ldots, R_n$ in a vector $V_R$.

Step 2.0—As shown in FIGS. 7 and 9, process $C_D$ and $C_q$ with the RRG 304 of FIG. 3 as follows:
- Step 2.0—Start processing each search engine $SE_j$ as follows:
  - Step 2.1.1—Select a search engine Sej (j=1,2, . . . n)
  - Step 2.1.2—Index all the documents $D_1, D_2, \ldots, D_0$
  - Step 2.1.3—Send the queries $Q_1, Q_2, \ldots, Q_n$
  - Step 2.1.4—For each query Qi, assign the relevancy Ri returned by the search engine Sej
- Step 2.2—Store all the collected relevancy measures in a vector $V_{SEj}$ Step 3.0—As shown in FIGS. 8 and 9, assign a score to each search engine using the SC module 306 of FIG. 3 as follows:
- Step 3.1—Select a vector distance algorithm d from the repository of algorithms (e.g. Euclidean distance)
- Step 3.2—Start processing each search engine $SE_j$ as follows:
  - Step 3.2.1—Select a search engine $SE_j$ (j=1,2, . . . n)
  - Step 3.2.2—Compute the distance between $V_{SEj}$ and Vr: d $(V_{SEj}, Vr)$
  - Step 3.2.3—Compute the score Sj=100/(1+d($V_{SEj}$, Vr)
  - Step 3.1.4—Assign the score Sj to the search engine Sej
- Step 4.0—Compare the search $SE_1, SE_2, \ldots, SE_n$ based on their score $S_1, \ldots, S_n$.

Above we have described one embodiment of the invention and modifications of this embodiment may be apparent to those skilled in the art. For instance as pointed out, different relevancy algorithms are easily accommodated. For this reason it should be understood that the present invention is not limited to the described embodiment but includes all changes that fall within the spirit and scope of the appended claims.

The invention claimed is:

1. A software program on a computer usable storage medium for performing a computer controlled method of determining the effectiveness of a search engine in performing searches in a search area comprising:

computer code generating controlled relevant documents by manipulation of relevant search terms of documents in the search area based on a relevancy algorithm; wherein the relevancy algorithm relates to positions of relevant search terms in documents and the generation of the controlled relevant documents is done by placing search terms into various positions in the document in accordance with the relevancy algorithm and wherein at least 3 different controlled relevant documents are produced for a given relevancy algorithm with search terms placed in different positions in different documents with each document compared with the document relevant to the search area with absence of search terms in that document to generate the relevancy vector chart;

using the controlled relevant documents to create a relevancy vector chart; and comparing results obtained from the search engine to the relevancy vector chart to provide a relevancy rating for the search engine with computer code using the relevancy vector chart to obtain a relative ranking of a plurality of search engines.

2. The software program of claim 1, wherein the computer code for creating controlled relevant documents creates a plurality of different relevancy vector charts each based on a different relevancy algorithm.

3. The software program of claim 2, including computer code for using the relevancy vector charts to obtain a relative ranking of a plurality of search systems.

4. A method of determining the relative effectiveness of search engines comprising the steps of:
selecting documents from a database;
generating from the selected documents controlled relevant documents by manipulation of relevant terms in the selected documents based on a relevancy algorithm; wherein the relevancy algorithm relates to positions of the relevant terms in documents and the generation of the controlled relevant documents is done by placing search terms into various positions in the controlled relevant documents in accordance with the relevant algorithm;
using the generated controlled relevant documents to create relevancy reference vectors;
searching the database using each of the search engines and generating performance vectors with the search results for each engine; and
comparing the performance vectors for each engine to the relevancy reference vectors to provide a relevancy rating for the search engines based on the relevancy algorithm using a relevancy vector chart made from the relevancy reference vectors to obtain a relative ranking of each of the search engines wherein at least 3 different controlled relevant documents are produced for each selected document using a given relevancy algorithm with search terms placed in 3 different positions in different documents with each document compared with the document relevant to the search area with an absence of search terms in the document to generate the relevancy reference vectors of the relevancy vector chart.

5. The method of claim 4, including removing relevant terms from the selected documents prior to placing the search terms into the various positions of the controlled relevant documents.

6. A method of determining the relative effectiveness of search engines in performing searches in a search area comprising:
generating a controlled relevant document by the arrangement of relevant search terms of a selected document in the search area in accordance with a relevancy algorithm;
wherein the relevancy algorithm relates to positions of relevant search terms in documents and the generation of the controlled relevant documents is done by placing search terms into various positions in the document in accordance with the relevancy algorithm and wherein at least 3 different controlled relevant documents are produced for a given relevancy algorithm with search terms placed in different positions in different documents with each document compared with the document relevant to the search area with absence of search terms in that document to generate the relevancy vector chart;
interrogating a database containing the search area with the search engines;
comparing by vector analysis, references obtained from the search engines with the controlled relevant document to provide a relevancy rating for the search engine to determine the relative effectiveness of the search engines;
generating vectors $V_r$ for the control relevant document and $V_{SEj}$ for search results of each search engine $SE_j$ (J=1, 2, . . . n);
computing the distance $d(V_{SEj}, V_r)$ between $V_{SEj}$ and $V_r$ for each search engine;
computing a score $Sj=100/1+d(V_{SEj}, V_r)$ for each search engine;
assigning the score Sj to each search engine $SE_j$; and
comparing the search engines $SE_1$, SE2, . . . $SE_n$ based on their scores Si, S2, . . . Sn.

7. The method of claim 6, including removing all relevant terms from the selected document prior to placing the search terms into various positions of the controlled relevant document.

8. The method of claim 6, wherein the relevancy algorithm relates to positions of the relevant terms in documents and the controlled relevant document is created by placing search terms into various positions in the selected document in accordance with the relevant algorithm.

9. The method of claim 8, wherein at least 3 different controlled relevant documents are produced from the selected document using a given relevancy algorithm with search terms placed in 3 different positions in the three different controlled relevant documents with each controlled relevant document compared with the selected document with an absence of search terms in the selected document to generate three controlled relevant vectors.

10. The method of claim 9 including using a relevancy vector chart made up of the three controlled relevant vectors to obtain a relative ranking of a plurality of search engines.

11. The method of claim 6 including creating a plurality of controlled relevant documents for different relevancy vectors each controlled relevant document in the plurality based on a different relevancy algorithm.

* * * * *